(12) United States Patent
Singh et al.

(10) Patent No.: US 6,425,093 B1
(45) Date of Patent: Jul. 23, 2002

(54) METHODS AND APPARATUSES FOR CONTROLLING THE EXECUTION OF SOFTWARE ON A DIGITAL PROCESSING SYSTEM

(75) Inventors: Amar Singh, Bothell; Richard Elmore, Kirkland, both of WA (US); Jonathan Feinstein, Ithaca, NY (US)

(73) Assignee: Sophisticated Circuits, Inc., Bothell, WA (US)

( * ) Notice: Subject to any disclaimer, the term of this patent is extended or adjusted under 35 U.S.C. 154(b) by 0 days.

(21) Appl. No.: 09/225,172

(22) Filed: Jan. 4, 1999

Related U.S. Application Data (60) Provisional application No. 60/070,385, filed on Jan. 5, 1998.

(51) Int. Cl.[7] .................................................. G06F 11/00
(52) U.S. Cl. ............................. 714/38; 714/48; 714/51; 714/55
(58) Field of Search ............................... 714/48, 49, 55, 714/23, 38, 51

(56) References Cited

U.S. PATENT DOCUMENTS

| | | | | |
|---|---|---|---|---|
| 5,594,865 A | * | 1/1997 | Saitoh | 714/55 |
| 5,761,414 A | * | 6/1998 | Akaishi | 714/55 |
| 5,978,939 A | * | 11/1999 | Mizoguchi | 714/55 |
| 5,991,856 A | * | 11/1999 | Spilo | 711/147 |
| 6,065,139 A | * | 5/2000 | Mehta | 714/55 |
| 6,182,238 B1 | * | 1/2001 | Cooper | 714/2 |
| 6,182,243 B1 | * | 1/2001 | Berthe | 714/38 |

* cited by examiner

*Primary Examiner*—Robert Beausoleil
*Assistant Examiner*—Bryce P. Bonzo
(74) *Attorney, Agent, or Firm*—Blakely, Sokoloff, Taylor & Zafman LLP (57) ABSTRACT

A method and an apparatus for controlling the operation of a digital processing system. In one example of a method of the invention, a first status indicator is received for a first software program which is executing on the digital processing system, and it is determined whether the first software program is in a first state. In response to determining that the first software program is not in the first state, then a first predetermined function is performed. In one embodiment, several additional status indicators may be received, one for each of several software programs which are executing on the system. For each additional status indicator, it is determined whether the corresponding software program is in the first state, and if it is not in the first state, then a corresponding, predetermined function is performed, such as (for example) relaunching the corresponding software. In one particular embodiment, the first status indicator, which indicates the first software program is not in a fault state, is provided by the first software program to another software program which is also executing on the system. In this particular embodiment, the first status indicator resets a counter which corresponds to the first software program and which is controlled by the another software program. The another software program determines the first software is in a fault state by examining a value of the counter.

33 Claims, 8 Drawing Sheets

METHODS AND APPARATUSES FOR CONTROLLING THE EXECUTION OF SOFTWARE ON A DIGITAL PROCESSING SYSTEM

RELATED APPLICATION

This application is related to and hereby claims the benefit of the filing date of a provisional application by the same inventors, Amar Singh, Richard Elmore, and Jonathan Feinstein, Ser. No. 60/070,385, filed Jan. 5, 1998.

BACKGROUND OF THE INVENTION

The present invention relates to methods and apparatuses for controlling the operation of a digital processing system. More specifically, the present invention relates to methods for monitoring the status of the operation of software on a digital processing system.

Conventional digital processing systems, such as modem computer systems, are often capable of executing software programs without the aid or monitoring by a human user. Often, several software programs may be run concurrently on the same computer system. For example, a computer system which is acting as a web server, or some other type of server in a computer network, may operate without the interaction or guidance from a local human user and may execute several software programs at the same time. Even though such systems generally work well without local user intervention, computer systems sometimes fail in one way or another. For example, a particular software program may have an internal failure, causing that program to stop functioning correctly on the computer system while other programs continue to operate properly. Alternatively, a more fundamental problem may develop in which the entire computer system "crashes" to the point that the computer is hung in a state in which it refuses to respond to all user interaction.

The prior approaches to solving these problems usually involves relaunching, through user interaction, the program which is at fault or by restarting, through user interaction, the entire computer system usually by turning the power off and then turning the power on in order to restart the entire computer system. Both of these techniques require a human user to provide instructions or otherwise operate the computer in such a manner as to either relaunch the application or to restart the entire computer system. Another approach in the prior art has allowed the user to remotely access a stalled computer system to restart the computer system upon discovering remotely, for example, that the computer system has crashed or is otherwise not responding. An example of this particular approach is described in U.S. Pat. No. 5,347,167 by Amar Singh of Sophisticated Circuits, Inc., of Bothell, Wash. A remotely located user may determine that a computer system has crashed and may, through the use of a telephone interface, cause the remotely located computer system to restart. This particular approach, however, requires user monitoring of the status of the remotely located computer and also requires user interaction once it is discovered that the computer system has failed. Further, this system does not provide monitoring on a program by program basis and does not allow the user to specify various actions in response to the failure of one program versus another program.

In view of the foregoing, it is desirable to provide an improved method and apparatus for controlling the operation of a digital processing system such as a computer system.

SUMMARY OF THE INVENTION

The present invention discloses methods and apparatuses for controlling the operation of a digital processing system. A method in one example of the invention receives a first status indicator for a first software program which is executing on the digital processing system. It is determined whether the first software program is in a first state; typically, this may occur by examining the information provided by the first status indicator. In response to determining that the first software program is not in the first state, then a first predetermined function is performed.

In one particular embodiment of the present invention, several additional status indicators may be received, one for each of several software programs which are executing on the system. For each additional status indicator, it is determined whether the corresponding software program is in the first state, and if it is not in the first state, then a corresponding, predetermined function is performed, such as (for example) relaunching the corresponding software.

In one particular embodiment, the first status indicator, which indicates the first software program is not in a fault state, is provided by the first software program to another software program which is also executing on the system. In this particular embodiment, the first status indicator resets a counter which corresponds to the first software program and which is controlled by the another software program. The another software program determines the first software program is in a fault state by examining the value of the counter.

Computer systems which practice the methods of the invention are also described. Further, computer readable media having software which allows the computer systems to perform the methods of the present invention are described.

BRIEF DESCRIPTION OF THE DRAWINGS

The present invention is illustrated by way of example and not limitation in the figures of the accompanying drawings, in which like references indicate similar elements.

DETAILED DESCRIPTION

The subject invention will be described with reference to numerous details set forth below, and the accompanying drawings which illustrate the invention. The following description and drawings are illustrative of the invention and are not to be construed as limiting the invention. Numerous specific details are described to provide a through understanding of the present invention. However, in certain instances, well known or conventional details are not described in order to not unnecessarily obscure the present invention in detail.

Figure 1:
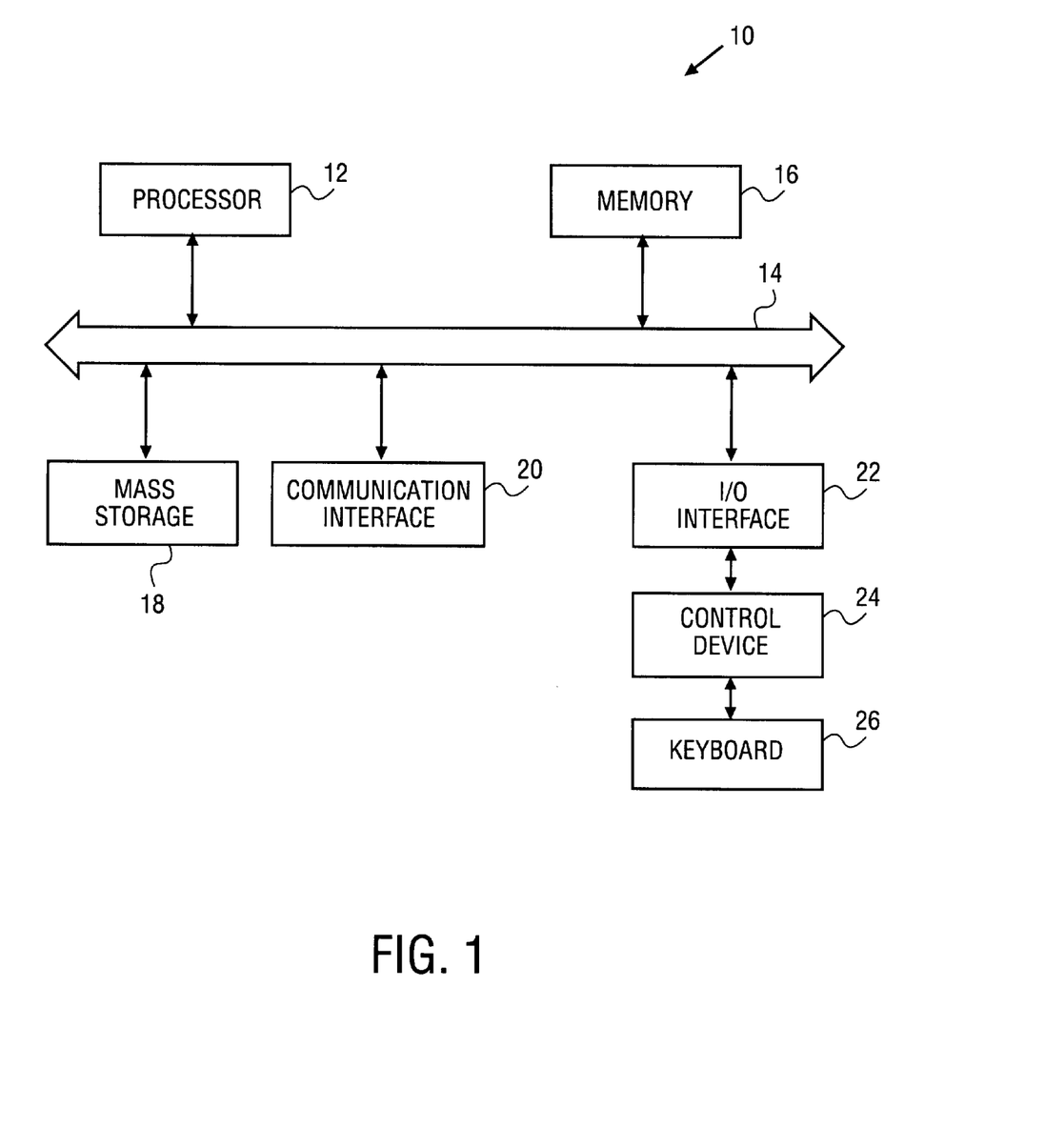
FIG. 1 illustrates an example of a digital processing system which may be used with the present invention.

FIG. 1 shows one example of a conventional computer system which may be used as a server computer system or as a stand alone computer system. It will be appreciated that the computer system is one form of a digital processing system. It will also be appreciated that the computer system 10 shown in FIG. 1 is one example of many possible computer systems which have different architectures. The computer system 10 includes a processor 12 which may be a conventional microprocessor, such as the Motorola PowerPC microprocessor or an Intel Pentium microprocessor. Memory 16 is coupled to the processor 12 by the bus 14, which may be considered to be a system bus. Memory 16 may be dynamic random access memory (DRAM) and may also include static RAM (SRAM). The bus 14 couples the processor 12 to the memory 16 and also to mass storage 18 and to the I/O (input/output) interface 22. The I/O interface 22 is shown in simplified form here to indicate the various controllers and interfaces used for the various peripheral devices, such as displays, printers, scanners, etc. It will be appreciated that a display device, such as a CRT or a liquid crystal display device is often coupled to the computer system 10 through an I/O interface, such as the interface 22. Other input and output devices may include disk drives, a digital camera, and a mouse or other pointing device. The mass memory 18 is often a magnetic hard disk, an optical disk, or another form of storage for large amounts of data. Some of this data is often written, by a direct memory access process, into memory 16 during execution of software in the system 10. The communication interface 20 allows the system 10 to interface to external systems. This interface 20 may be an analog modem, an ISDN modem, a cable modem, a Token Ring interface, a satellite transmission interface (e.g. "Direct PC"), or other interfaces for coupling a digital processing system to other digital processing systems.

It will be appreciated that system 10 of FIG. 1 represents any of a number of different possible digital processing systems. For example, a network computer may also be considered to be a computer system or a digital processing system which may be used with the present invention. Network computers may not include a hard disk or other mass storage, and the executable programs are loaded from a network connection into the memory 16 for execution by the processor 12. A WebTV system, which is known in the art, may be considered to be a computer system according to the present invention, but it may not include certain features shown in FIG. 1. A cellular phone having a suitable display and a processor and memory may also be considered to be a digital processing system or a computer system which may be used with the present invention. A typical computer system will usually include at least a processor, memory, and a bus coupling the memory to the processor. It will also be appreciated that the system 10 is typically controlled by an operating system software.

The computer system 10 of FIG. 1 includes a control device 24 which is coupled to the I/O interface 22 and is also coupled to the keyboard 26. This control device may be used in certain embodiments of the present invention in order to cause certain actions to occur as a result of monitoring the status of one or more software programs which are executing on the processor 12. In one particular embodiment the control device 24 is coupled to the Apple Desktop Bus (ADB) which is found on the Macintosh line of computer systems from Apple Computer, Inc. of Cupertino, Calif. The control device is plugged into the ADB port of the computer system and the computer's keyboard is plugged into the control device 24. The system 10 typically receives its power supply through the control of the control device 24; that is, the control device 24 controls the supply of power to the system 10.

In another embodiment of the invention, the control device 24 may be coupled to a computer system through a Universal Serial Bus (USB) interface. That is, the I/O interface 22 is a USB interface, and the control device 24 is a USB peripheral which controls power to the computer system 10. In this embodiment, the I/O interface 22 may be a conventional USB hub and the control device 24 is a USB peripheral which operates according to conventional USB methods. Also in this embodiment, the keyboard 26 normally would be coupled separately and directly to the I/O inter face 22 rather than through the control device 24.

Figure 2:
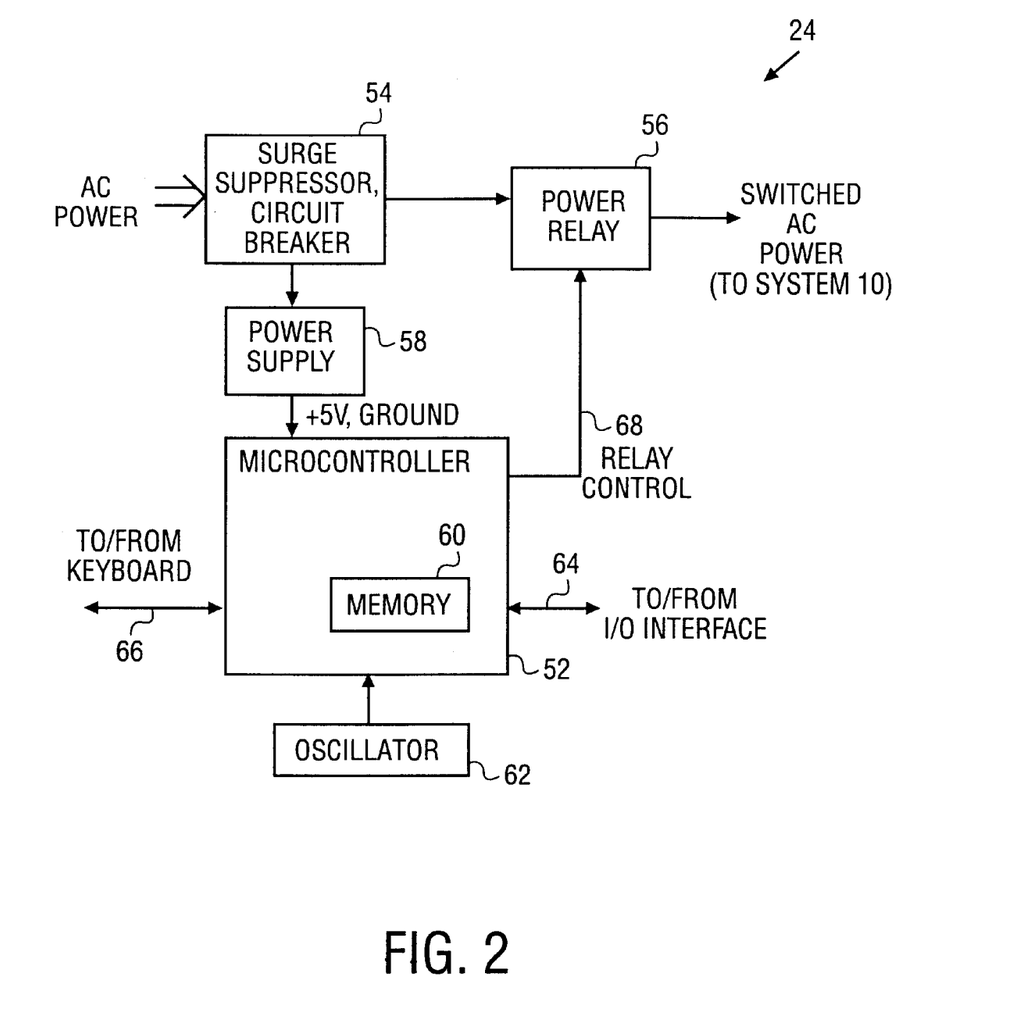
FIG. 2 illustrates a particular implementation of a control device which may be used with the present invention.

FIG. 2 shows an example of a control device 24. It will be appreciated that alternative implementations of this control device may be used depending upon the architecture of the particular computer which is coupled to and operates with the control device. The control device 24 in this particular example, includes a surge suppressor and circuit breaker 54 which is coupled to provide power from a power source, such as AC power, to a power supply 58 and to a power relay 56. The power supply 58 provides rectified DC power from the power source, such as AC power, to the microcontroller 52. The power relay 56 provides a switched AC power supply (or other switched power supply) to other components, such as the system 10, under the control of the relay control signal 68 provided from the microcontroller 52. Thus, the microcontroller 52 may control the supply of power to the system 10. The microcontroller 52 is coupled to the keyboard through the connection 66 and is coupled to the I/O inter face through the connection 64. An oscillator 62 provides a timing signal to the microcontroller 52. The microcontroller 52 includes memory 60 which is used to store software and information which may be used to practice the methods of the present invention as described herein. Alternatively, the microcontroller 52 may access externally located memory such as flash memory which is also powered by the power supply 58. In the particular example provided here, the control device is coupled to an I/O interface and a keyboard. However, the control device may be coupled to other I/O interfaces, such as a conventional serial port (e.g. RS-232, Universal Serial Bus, Firewire IEEE 1394, etc.), or a network connection (e.g. Ethernet, Token Ring, TCP/IP, etc.), and the control device does not need to be coupled to a keyboard as described herein.

The control device 24 functions in combination with, in accordance with one embodiment of the present invention, software operating on the digital processing system to which the control device 24 is coupled. The control device 24 can turn the power to the computer system on or off when the computer system 10 receives its AC power supply from the power relay 56. Also, the control device 24 can send command signals to the computer system 10 through the I/O interface 22 through the connection 64. In this manner, the control device 24 may restart the entire computer system or may relaunch a particular application or may provide other instructions or operations as determined by a user. This will be described in more detail below.

Figure 3:
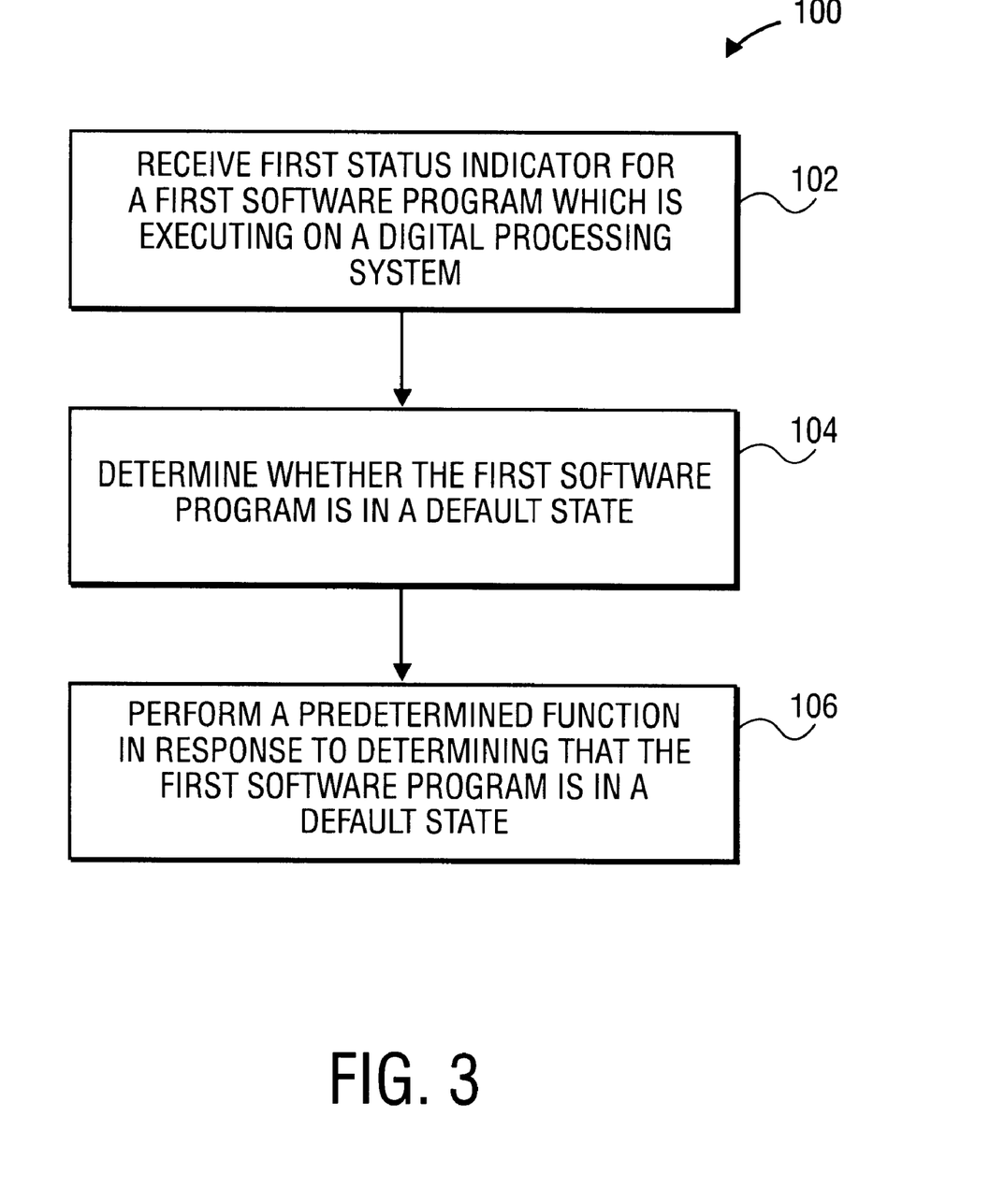
FIG. 3 shows a flowchart indicating one example of a particular method of the present invention for monitoring the operation of a particular software program.

FIG. 3 illustrates a flowchart for one method of the present invention. In this example, the processor 10 is executing a first software program. Typically, the first software program is stored, at least in part, in the memory 16. In step 102, a first status indicator is received for the first software program. This status indicator may be provided by the first software program itself. For example, the first status indicator may be an AppleEvent in the case of a Macintosh computer which is provided by the first software program to another software program (e.g. a "Daemon" application) which is also executing in the system 10. This AppleEvent will permit the other software program to determine whether the first software program is in a fault state, as in step 104. Alternatively, the other software program could check the state of the first software program. This may be employed in certain cases where the first software program is repeatedly performing certain actions which can be ascertained by another software program. However, in many cases, many failures are internal to the application and not available to the system or to other application programs.

In response to determining that the first software program is in a fault state, at least one predetermined function is performed as shown in step 106. This predetermined function may involve relaunching the first software program by causing it to quit and then by restarting the software program. Alternatively, the predetermined function may involve restarting the entire system. In one particular embodiment, the predetermined function may be performed by a script, such as an AppleScript which is called upon when the other software program has detected a fault state for the first software program. This AppleScript has been predetermined in this particular case to cause the first software program to quit and then for the first software program to be relaunched. This will often cure the fault state such that the first program is now fully operational on the computer system.

In one particular embodiment, the first software program may directly specify a response by the other software program. For example, if the first software program determines there is an internal fault, it may signal to the other software program that an internal fault has occurred and that certain actions, which are typically predetermined by the user, should be performed in order to cure the fault state for the first software program. It will also be appreciated that a matrix of application conditions may require different responses. For example, if a web server fails while an FTP server is in the middle of a large download, it would be desirable to allow the download to complete before restarting the entire computer system. In addition, it would be helpful to notify the FTP server that it should deny any new requests for files until the restart is completed. By allowing the user to specify responses based upon the running applications and their states as well as the failed application, greater control of the system's response to various failures is provided to the human user. Thus, the response which may be specified can be dependent on the context of the running and failed applications and which applications are running and which have failed. This control, moreover, is automatic and may not require user interface and intervention at the time of the various failures.

Figure 4:
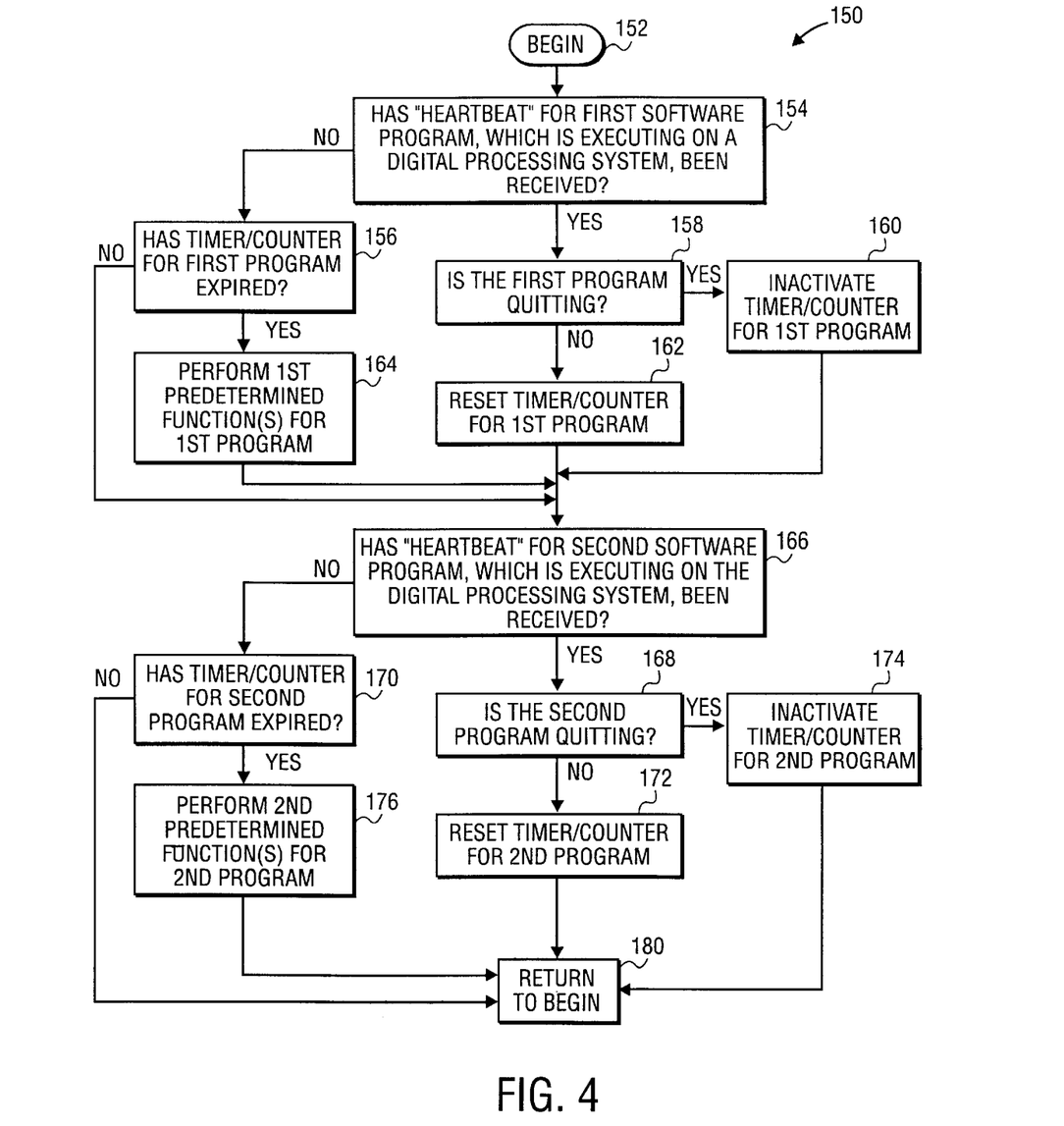
FIG. 4 shows another example according to the present invention in which multiple software programs are monitored in accordance with the present invention.

FIG. 4 shows a more specific example of one method of the present invention. The method 150 shown in FIG. 4 assumes two software programs are executing on the processor 12. It will be appreciated that the present invention allows the monitoring of multiple (e.g. more than two) software programs and the two software programs were picked in this example for purposes of illustration. It will also be understood that the various steps are shown in a particular sequence in FIG. 4 in order to explain the present invention. It will be appreciated that these steps may be performed in a different order and yet accomplish substantially the same result.

In step 154, a monitoring software program, sometimes referred to as the third software program or as the daemon application, determines whether a "heartbeat" for a first software program has been received. Typically, each application program which is being monitored will send a heartbeat periodically to the monitoring software program. Each application being monitored will typically request a timer in the monitoring program. This process can be an automatic byproduct of the first heartbeat being sent to the monitoring program. Typically, the heartbeat for a particular application will specify the timeout desired by the particular application. The heartbeat will continue to be sent by the particular software program until a failure event occurs. This event can be the result of a failure of the application which prevents it from sending the heartbeat message or by an internally detected problem which is handled by the application by stopping the heartbeat. It is also possible for the application to send a failure event directly to the monitoring application to initiate a failure response without waiting for a timer to timeout. If, from step 154, it is determined that the heartbeat has been received, then processing proceeds to step 158 in which it is determined whether or not the first program is quitting. The heartbeat will typically specify whether the program is quitting by setting the appropriate timeout value in the heartbeat. In one particular implementation, the heartbeat may be an AppleEvent which includes a timeout value; a timeout value of 0 may indicate that the first program is quitting and a timeout value of another value specifies the timeout period for the timer which is being maintained by the monitoring software program. If the program is quitting then in step 160 the timer/counter maintained by the monitoring program is inactivated for the first program. This is done in order to prevent the system from thinking that the first software program has failed when in fact the user caused it to quit.

If no heartbeat is received in step 154, then processing branches to step 156 in which it is determined whether or not the timer/counter for the first program has expired. If it has not, processing jumps in the example shown here to step 166. If the timer has expired, then in step 164 at least one predetermined function is performed for the first program. This predetermined function may include relaunching the first software program in order to attempt to cure the fault condition. Numerous other possible predetermined functions may be performed instead of relaunching the program. For example, the entire system may be restarted. If the heartbeat has been received as indicated in step 154 and the first program is not quitting as indicated in step 158, then the counter/timer for the first program is reset.

Processing for the second software program begins at step 166 which may be arrived at in the particular example shown in FIG. 4 from either a quitting action of the first program or by performing a first predetemined function for the first program in step 164 or by merely determining that the timer/counter has not expired in step 156. In addition, this step may be arrived at after resetting the timer/counter for the first program in step 162. It will be appreciated that in alternative embodiments, this step 166 may be performed at different times in a different sequence than shown in FIG. 4. In step 166, it is determined whether or not the heartbeat for the second software program has been received. Typically this will be determined by the monitoring program, referred to as a third software program. If the heartbeat has been received then in step 168 it is determined whether or not the second program is quitting. If it is not quitting, then in step 172 the timer/counter for the second program is reset and then processing returns to step 152. If the heartbeat has been received and the second program is quitting as indicated in step 168 then the timer/counter for the second program is inactivated in step 174 and processing returns to step 152. If no heartbeat has been received as determined in step 166, processing proceeds to step 170 in which it is determined whether the timer/counter for the second program has expired. If it has not, then processing returns to step 152. If this timer has expired, then at least one predetermined function for the second program is performed in step 176. This predetermined function may be any one of relaunching the particular software program; restarting the entire digital processing system; transmitting a message to a remote digital processing system; or recording information (e.g. in an error log) concerning the fault condition. The predetermined function may be specified by a user to be dependent on the states of certain running applications and the identity and states of the failed programs. The error log may serve as an interface to the user and allow the user to specify the predetermined function depending on the states of the identified programs which have failed.

It will be appreciated that the system will repeatedly receive heartbeats and reset the timer/counter for a particular program and that no predetermined function will be performed for the particular program as long as the program is operating in a normal state without a fault condition. The fault condition will cause the heartbeat to not be provided and thus the timer will not be reset. When the timer expires, the system will determine that the particular software is in a fault condition and the predetermined function or functions will be performed for the particular program.

Figure 5:
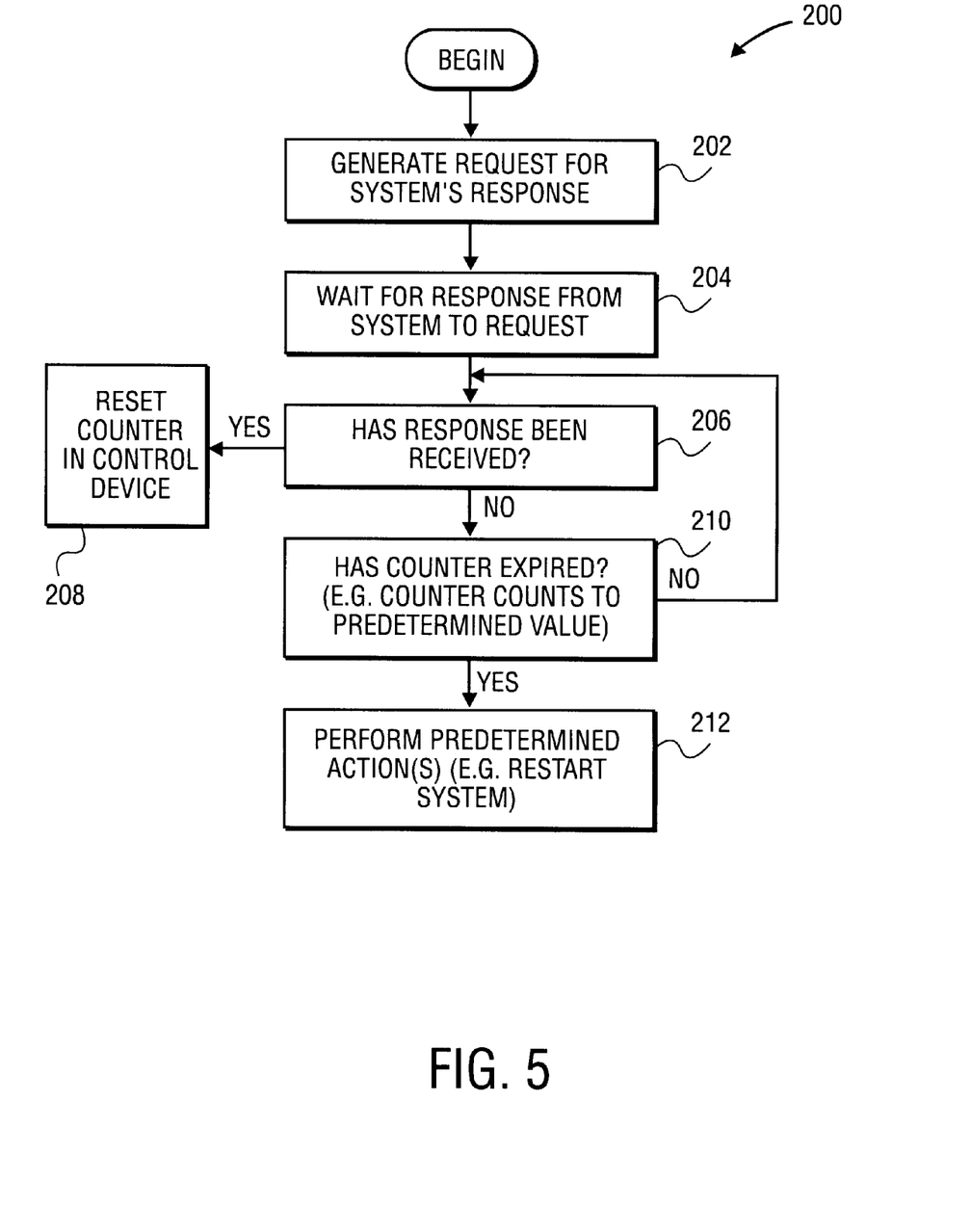
FIG. 5 shows a flowchart for a method of monitoring and responding to the status of a digital processing system in accordance with one aspect of the present invention.

In addition to providing this level of functionality with respect to maintaining proper operation of a digital processing system, the invention may employ an additional level of security and monitoring by also monitoring the status of the hardware (and system software). It will be appreciated that this adds an additional level of monitoring which may not be provided by an implementation of the method shown in FIG. 4. In particular, if the entire digital processing system crashes such that the timers/counters maintained for the various programs cannot expire because they are no longer counting, then a purely software implementation of the method shown in FIG. 4 will not properly diagnose the status of the various programs because the monitoring program is no longer executing on the digital processing system. FIG. 5 shows an example of a method for monitoring for a complete failure such as a system crash. This method typically involves a master hardware based timer and this method may be used with the method of FIG. 4. This timer may be placed in the control device 24 and be continuously powered by the power supply 58. The method 200 of FIG. 5 begins in step 202 in which a request for the system's response is generated. This request would typically be created by monitoring software and directed to the processor 12. In step 204 a response to the request is awaited and in step 206 it is determined whether or not a response has been received. Typically, the processor will respond to the software request, causing the monitoring software to signal that a response has occurred to the control device 24. This causes, in step 208, the counter in the control device to be reset and processing returns back to step 202 as shown in FIG. 5. If no response has been received as determined in step 206 then processing proceeds to step 210 in which it is determined whether the counter has expired. This counter may be maintained and controlled in the control device such that the determination of whether the counter has expired is performed by the microcontroller 52 which also controls the counting of the counter and the resetting of the counter. Once the counter has counted to a predetermined value, which may be specified by a user, the microcontroller in step 212 will perform the desired predetermined actions, such as restarting the entire system. This may be performed by the microcontroller sending the proper restart codes (e.g. the signals caused by pressing a particular group of keys on the keyboard) to the I/O interface which will then cause the entire computer system to be rebooted or otherwise restarted. The microcontroller 52 may also temporarily turn off the power supply to the digital processing system by controlling the relay control line 68 and then turning power back on to restart the system.

Another example of a method for providing an additional level of monitoring involves the use of a heartbeat sent from the daemon program to the control device 24. This alternative method may be used instead of the method shown in FIG. 5. In this alternative method, the daemon program, which is executing on the digital processing system 10 that is coupled to the control device 24, repeatedly sends a status indicator (e.g. set timer in control device to 5 minutes and start counting) to the control device 24 as long as the daemon program and the system 10 are not in a fault state. Each status indicator, when received by the control device 24, resets a timer or counter maintained by the control device 24. If the counter is not reset after a user predetermined period it will reach a predetermined value, then the control device 24 performs a predetermined function such as restarting the digital processing system. When the system 10 and the daemon are not in a fault state the counter will be reset before it can reach the predetermined value.

Figure 6:
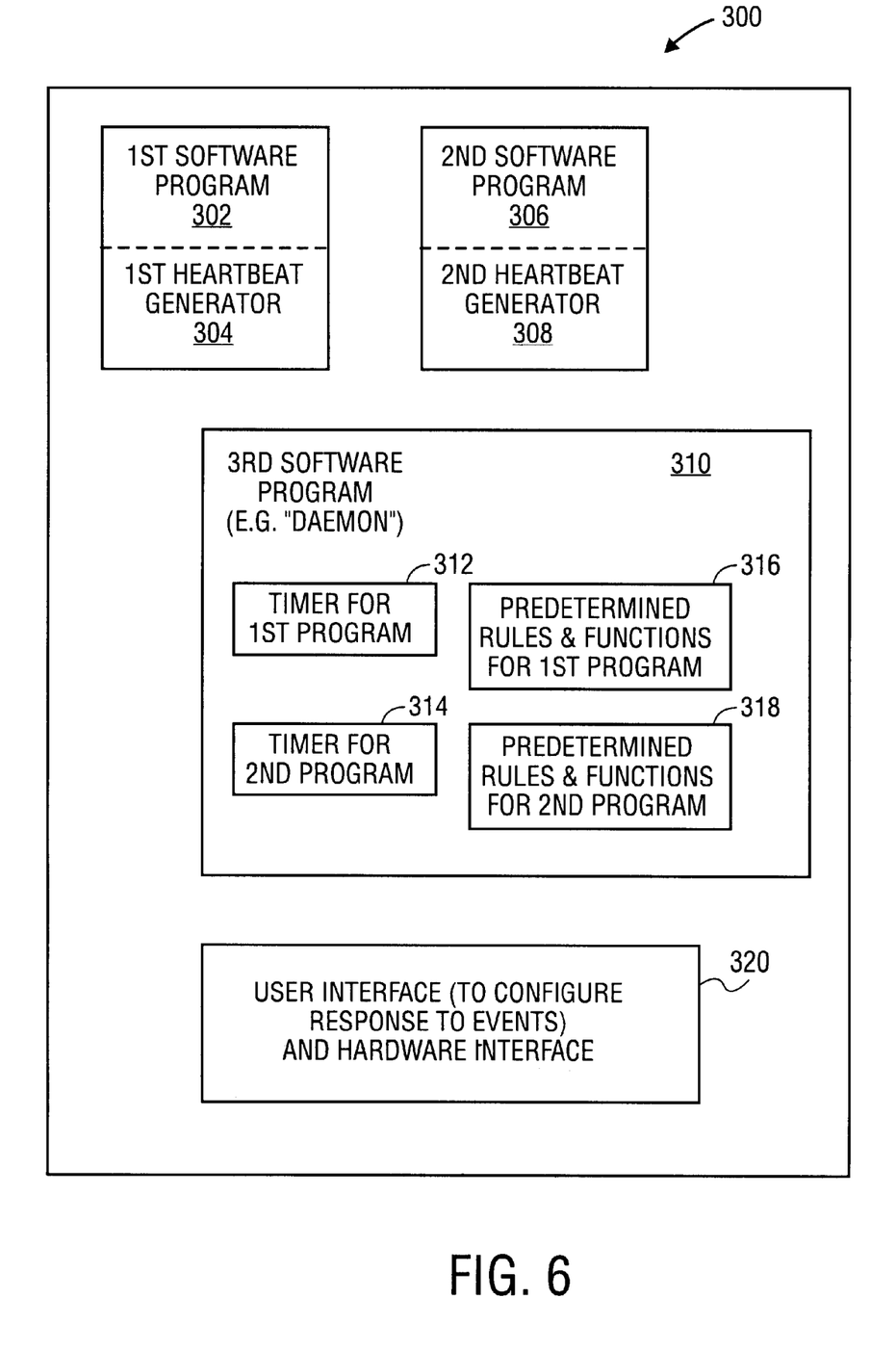
FIG. 6 shows an example of a computer readable storage media for a digital processing system which may be used with one aspect of the present invention.

FIG. 6 shows one example of a computer readable media which contains various software programs and information which allow a digital processing system to operate in accordance with the methods of the present invention. It will be appreciated that the actual memory which stores this information may be different elements, such as memory 16 and mass storage 18, or they may be the same element, such as memory 16. In one example of a network computer where there is no non-volatile mass storage, the necessary software files and data files may be downloaded to the memory 16 for execution in a processor of the network computer. In this case, the memory 16 provides the computer readable medium. In one embodiment, the computer system's computer readable media may at some time be entirely stored in a non-volatile mass memory, such as a hard disk or other mass storage device. At other times, the various elements shown in FIG. 6 may be dispersed between dynamic memory, such as the memory 16 and a mass storage, such as mass storage 18. FIG. 6 shows an example of a computer readable storage media according to the present invention. This media 300 includes executable computer program instructions which cause the computer system to perform a method of the present invention. The medium includes a first software program 302 and a second software program 306, each of which has its respective heartbeat generators 304 and 308. A third software program, sometimes referred to as the monitoring software or a "daemon" component 310 includes software 312 for providing and controlling a timer for the first program and software 314 for providing and controlling a timer for the second program. In addition, data and instructions 316 provide predetermined rules and functions for the first program which specify how to handle particular failures which occur for the first program. Similarly, data and instructions 318 includes data and instructions for handling various faults which may occur for the second program. Software 320 provides a user interface to allow the user to configure the response for different types of failures for the different programs and also includes the software for providing an interface to the hardware, such as the control device 24.

Figure 7:
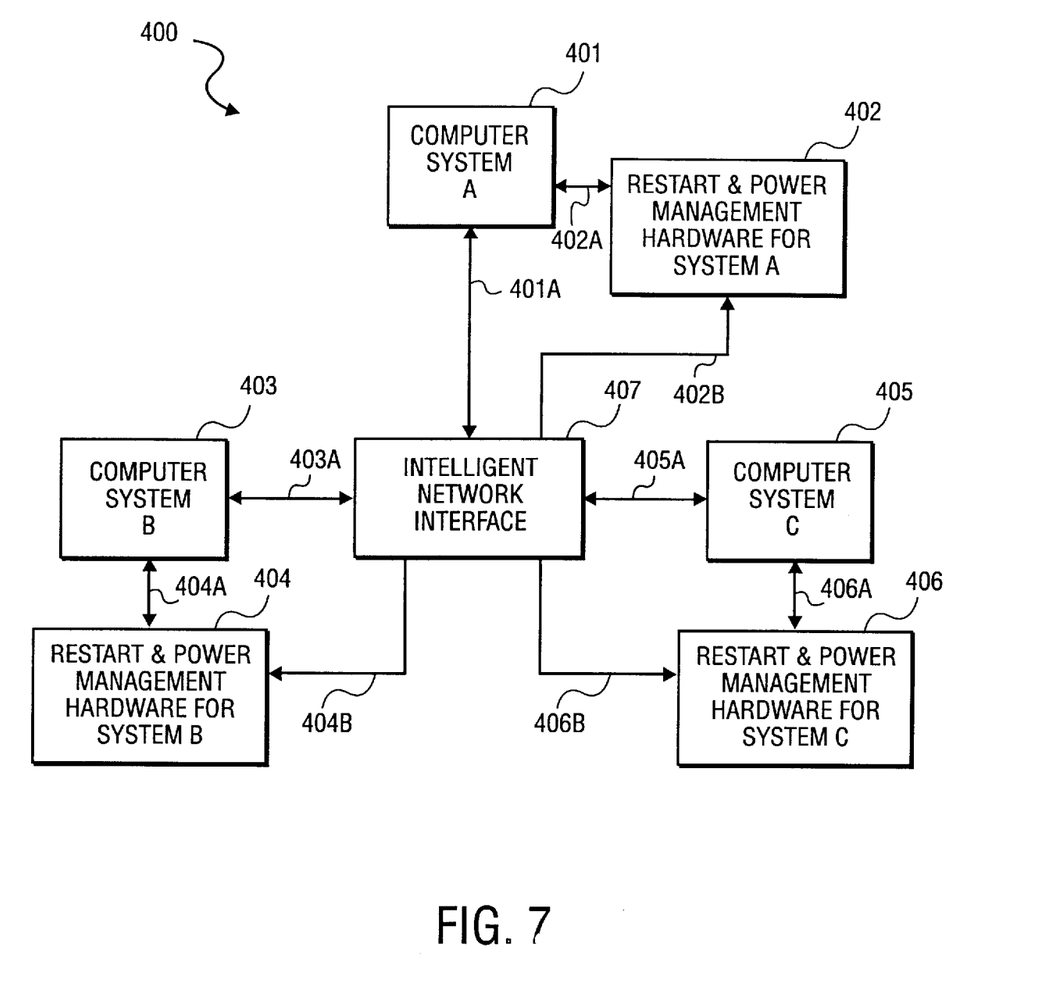
FIG. 7 shows an example of a network of systems with multiple timers.

FIG. 7 shows another embodiment of the present invention. In particular, FIG. 7 shows a system 400 of a network of timers, each associated with a particular computer system. The system 400 includes three computer systems 401, 403 and 405, each coupled by a network connection (such as 401a, 403a, or 405a) to an Intelligent Network Interface (INI) 407 through the corresponding network connection. For example, system 401 is coupled to INI 407 through the network connection 401a, and system 403 is coupled to INI 407 through the network connection 403a. The network connection may use Ethernet or TCP/IP protocols, for example. Each computer system may have several software programs executing on the system and each software program may send its identified "heartbeat" (as in FIG. 4) to the INI 407 through the system's corresponding network connection. Each heartbeat from each system will normally identify the program and computer system which issued the heartbeat, and this allows the INI to maintain multiple timers for the multiple applications running on each computer system. In one embodiment the INI 407 is a device which contains the networking hardware to maintain the network communications (such as a TCP/IP stack) and also track the timers which are instantiated for each of the tracked application processes (e.g. those software application processes which are sending heartbeats to the INI 407) on each of the computer systems. The timers for each tracked application on each computer system may be instantiated in the INI 407 although alternatively they may be instantiated in the hardware of the computer system's associated restart and power management hardware. In one case, the INI 407 may itself be a computer system. Each computer system is coupled to its own restart and power management hardware (RPMH) (and optionally software) for controlling the respective computer system. For example, system 401 is coupled to RPMH 402, which may be similar to control device 24, and system 403 is coupled to RPMH 404, which may be similar to control device 24. The RPMH 404 is coupled to system 403 through interface 404a (e.g. a serial, USB or Apple Desktop bus interface) and is coupled to INI 407 through either a network or hardwired (e.g. dedicated) connection 404b. The RPMHs 402 and 406 are similarly coupled to their respective computer system and INI 407.

The INI 407 may receive heartbeats from respective tracked software programs and perform the method of FIG. 4 for each tracked program. The INI 407 may send a signal to a respective RPMH when a tracked program on a tracked computer system has reached a fault state (e.g. indicated by a timer, for the tracked program, timing out). The RPMH will then perform a predetermined function.

In one example, each computer may have the same set of software applications, each reporting to the INI 407. A RAIC (redundant array of inexpensive computers) is an example of such a network. Since the software application processes are each identical, the INI must individually track the responses (e.g. heartbeats) from each software application process from each computer system. When a predetermined function is required (e.g. restart the failed Web server software on computer system A) it will be possible for the INI to identify the computer system needing attention and to cause a signal to be sent to the corresponding RPMH to cause a predetermined action to occur on the hardware (e.g. a hard restart of the entire computer system) or software (e.g. forced quitting and restarting of failed software application) interface.

Figure 8:
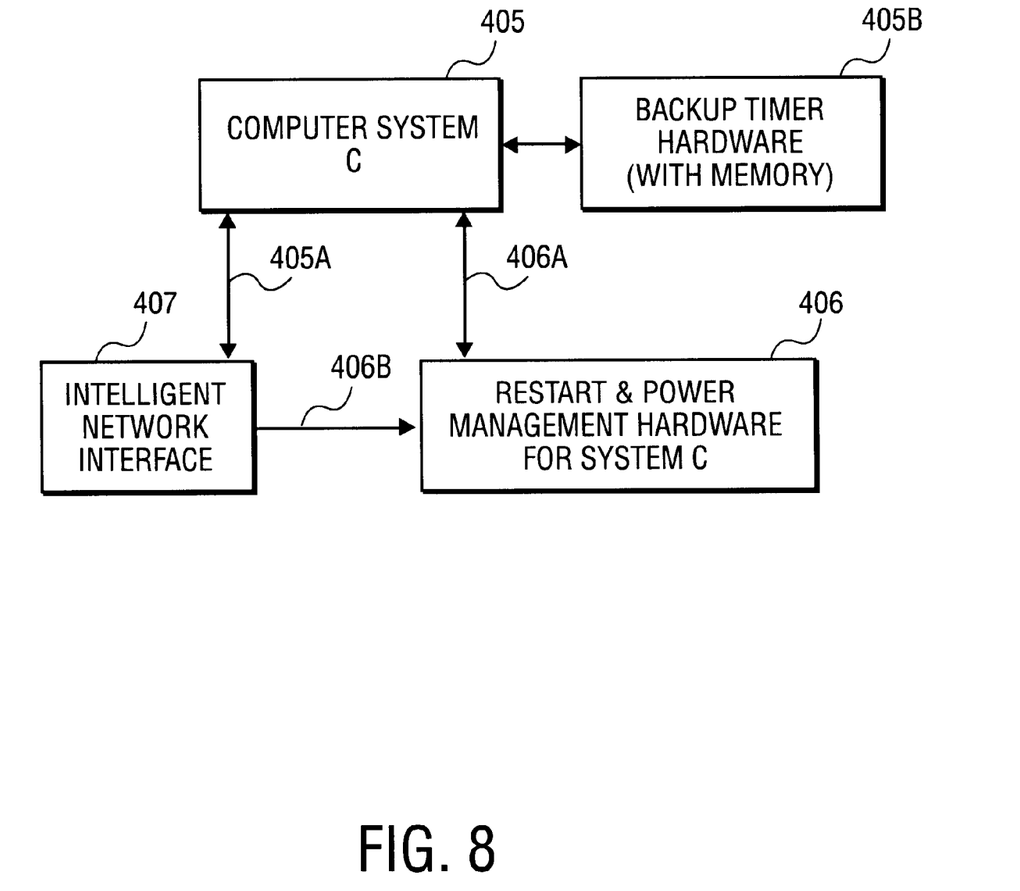
FIG. 8 shows an example of a distributed system with a backup timer.

FIG. 8 shows an alternative example of FIG. 7 wherein at least one of the computer systems includes an independent backup timer 405b. This backup timer is similar to control device 24 and also includes memory for error tracking. Some or all computer systems in system 400 may include such a backup timer.

The addition of a second, independent (backup) hardware timer device provides yet another layer of reliability to distributed systems.

The first advantage is in the case of a communications failure between a computer system and the intelligent network interface. An example of the first advantage occurs when the failure is in network hardware such as a hub. Should the hub fail, thereby preventing communications with the INI, it would appear to the INI that all the computer systems on the network had failed. The response would be to restart the computer systems or perhaps to program the software to interpret such a simultaneous failure as a network failure. The addition of local intelligence would allow a hand-off to the local device to occur when communications are lost. This would allow the local timers to be maintained and prevent an unnecessary reaction by the INI. The hand-off may be performed by a direct (hardwired) connection between timer 405b and the INI 407.

The second advantage is in the reporting of errors. When a computer system enters a fault state it is very likely that communications between the computer system and the INI will fail before the computer system fails itself. The availability of a local persistent data store will allow the capture of error state information which may be impossible to receiver via the network interface. This error state information is crucial to appropriate analysis of error conditions and key to the development of high reliability systems. This need might also be served using a low level software process.

The foregoing description has assumed certain computer architectures for implementing the present invention. It will be appreciated that there is no limitation on the location of the timers which are reset by the heartbeats. It will be appreciated that in one implementation of the present invention, each timer may be implemented as a combination of hardware and software. A hardware timer can be hosted in an external device, such as device 24, or internally to the digital processing system.

The foregoing description has provided numerous examples of the present invention. It will be appreciated that various modifications and changes may be made without departing from the broader spirit and scope of the invention as set forth in the appended claims.

What is claimed is:

1. A method for controlling the operation of a digital processing system, said method comprising:
   receiving a first status indicator for a first software program which is executing on said digital processing system;
   determining whether said first software program is in a first state;
   performing a first predetermined function in response to determining that said first software program is not in said first state;
   wherein said first status indicator is provided by said first software program to a third software program, and wherein said first status indicator resets a first counter controlled by said third software program, and wherein said third software program determines that said first software program is in said first state by examining a value maintained by said first counter.

2. A method as in claim 1 wherein said third software program causes said digital processing system to perform said first predetermined function and wherein said first software program is not in said first state when said first software program is in a fault condition.

3. A method as in claim 2 wherein said first predetermined function comprises at least one of (a) relaunching said first software program; (b) restarting said digital processing system; (c) transmitting a message to a remote digital processing system; or (d) recording information concerning said fault condition.

4. A method as in claim 1, said method further comprising:
receiving a second status indicator for a second software program which is executing on said digital processing system;
determining whether said second software program is in said first state;
performing a second predetermined function in response to determining that said second software program is not in said first state.

5. A method as in claim 4 wherein said second predetermined function is the same function as said first predetermined function.

6. A method as in claim 4 wherein said first predetermined function and said second predetermined function are separately user definable.

7. A method as in claim 4 wherein said second status indicator is provided by said second software program to said third software program, and wherein said second status indictor resets a second counter controlled by said third software program, and wherein said third software program determines that said second software program is in said first state by examining a value maintained by said second counter.

8. A method as in claim 7 wherein said first predetermined function and said second predetermined function are separately user definable and wherein at least one of said first predetermined function and said second predetermined function is capable of being specified by a user to be dependent on a state of an executing software program.

9. A method as in claim 8 wherein said first predetermined function comprises at least one of (a) relaunching said first software program; (b) restarting said digital processing system; (c) transmitting a message to a remote digital processing system; or (d) recording information concerning said fault condition.

10. A method as in claim 7 wherein when said first software program quits executing on said digital processing system, said first software program causes said first counter to be disabled.

11. A method as in claim 7 further comprising transmitting a signal to a control circuit which causes said digital processing system to restart.

12. A method as in claim 1 wherein said first status indicator is provided by said first software program through a network connection to the third software program which is executing on another digital processing system.

13. A method as in claim 12 wherein said first status indicator comprises an identifier of said first software program and a network address of said digital processing system.

14. A computer readable medium containing executable computer program instructions which, when executed, cause a digital processing system to perform a method comprising:
receiving a first status indicator for a first software program which is executing on said digital processing system;
determining whether said first software program is in a first state;
performing a predetermined function in response to determining that said first software program is not in said first state;
wherein said first status indicator is provided by said first software program to a third software program, and wherein said first status indicator resets a first counter controlled by said third software program, and wherein said third software program determines that said first software program is in said first state by examining a value maintained by said first counter.

15. A computer readable medium as in claim 14 wherein said third software program causes said digital processing system to perform said first predetermined function and wherein said first software program is not in said first state when said first software program is in a fault condition.

16. A computer readable medium as in claim 15 wherein said first predetermined function comprises at least one of (a) relaunching said first software program; (b) restarting said digital processing system; (c) transmitting a message to a remote digital processing system; or (d) recording information concerning said fault condition.

17. A computer readable medium as in claim 14, said method further comprising:
receiving a second status indicator for a second software program which is executing on said digital processing system;
determining whether said second software program is in said first state;
performing a second predetermined function in response to determining that said second software program is not in said first state.

18. A computer readable medium as in claim 17 wherein said second predetermined function is the same function as said first predetermined function.

19. A computer readable medium as in claim 17 wherein said first predetermined function and said second predetermined function are separately user definable.

20. A computer readable medium as in claim 17 wherein said second status indicator is provided by said second software program to said third software program, and wherein said second status indicator resets a second counter controlled by said third software program, and wherein said third software program determines that said second software program is in said first state by examining a value maintained by said second counter.

21. A computer readable medium as in claim 20 wherein said first predetermined function and said second predetermined function are separately user definable.

22. A computer readable medium as in claim 21 wherein said first predetermined function comprises at least one of (a) relaunching said first software program; (b) restarting said digital processing system; (c) transmitting a message to a remote digital processing system; or (d) recording information concerning said fault condition.

23. A computer readable medium as in claim 20 wherein when said first software program quits executing on said digital processing system, said first software program causes said first counter to be disabled.

24. A computer readable medium as in claim 20 wherein said method further comprises transmitting a signal to a control circuit which causes said digital processing system to restart.

25. An apparatus for controlling the operation of a digital processing system, said apparatus comprising:

means for receiving a first status indicator for a first software program which is executing on said digital processing system;

means for determining whether said first software program is in a first state;

means for performing a first predetermined function in response to determining that said first software program is not in said first state;

wherein said first status indicator is provided by said first software program to a third software program, and wherein said first status indicator resets a first counter controlled by said third software program, and wherein said third software program determines that said first software program is in said first state by examining a value maintained by said first counter.

26. An apparatus as in claim 25 wherein said third software program causes said digital processing system to perform said first predetermined function and wherein said first software program is not in said first state when said first software program is in a fault condition.

27. An apparatus as in claim 26 wherein said first predetermined function comprises at least one of (a) relaunching said first software program; (b) restarting said digital processing system; (c) transmitting a message to a remote digital processing system; or (d) recording information concerning said fault condition.

28. An apparatus as in claim 25, said apparatus further comprising:

means for receiving a second status indicator for a second software program which is executing on said digital processing system;

means for determining whether said second software program is in said first state;

means for performing a second predetermined function in response to determining that said second software program is not in said first state.

29. An apparatus as in claim 28 wherein said first predetermined function and said second predetermined function are separately user definable.

30. An apparatus as in claim 28 wherein said second status indicator is provided by said second software program to said third software program, and wherein said second status indictor resets a second counter controlled by said third software program, and wherein said third software program determines that said second software program is in said first state by examining a value maintained by said second counter.

31. An apparatus as in claim 30 wherein said first predetermined function is user definable and comprises at least one of (a) relaunching said first software program; (b) restarting said digital processing system; (c) transmitting a message to a remote digital processing system; or (d) recording information concerning said fault condition.

32. An apparatus as in claim 29 wherein when said first software program quits executing on said digital processing system, said first software program causes said first counter to be disabled.

33. An apparatus as in claim 29, said apparatus further comprising means for transmitting a signal to a control circuit which causes said digital processing system to restart.

* * * * *